H. L. PALMER.
PRESERVING VEGETABLE EXTRACTS.

No. 105,485.

Patented July 19, 1870.

United States Patent Office.

HENRY L. PALMER, OF STILLWATER, NEW YORK.

Letters Patent No. 105,485, dated July 19, 1870.

IMPROVEMENT IN PRESERVING VEGETABLE EXTRACTS.

The Schedule referred to in these Letters Patent and making part of the same.

I, HENRY L. PALMER, of Stillwater, in the county of Saratoga, State of New York, have invented a new and useful Improved Mode of Preserving Vegetable Extracts, of which the following is a specification.

Nature and Objects of the Invention.

The inspissated juices or vegetable extracts, in a semi-fluid condition, are inclosed in flexible capsules, provided with nozzles and screw-caps, by which their contents are hermetically sealed, and from which, on the removal of the caps, they may be ejected in such quantity as may be desired. The expulsion of the contents in part is not attended with the admission of air, and the replacement of the cap places the remainder of the contents in as perfect a condition for preservation as before the withdrawal of a part.

Description of the Accompanying Drawing.

Figure 1:
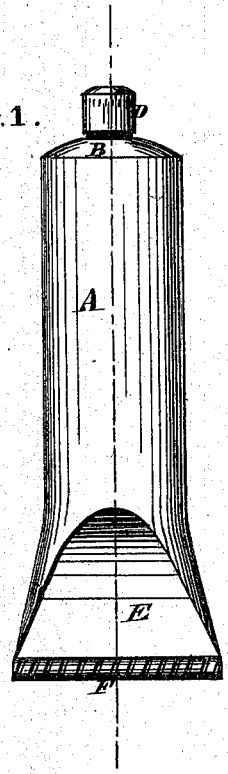
Figure 2:
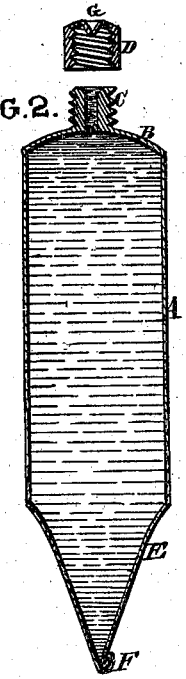

Figure 1 is an elevation.
Figure 2 is a longitudinal section.

The capsule A is of a flexible material, impervious to air and water, and such as will not be corroded by the contents. It may be of tin, made by drawing into a tubular shape, with the end B closed. The closed end is termed the breast, and has a nipple, C, on whose exterior is a thread to fit the interior screw of the cap D. The nipple is traversed by a canal, through which the medicaments are introduced and withdrawn, and at the outer end of the canal is a valve-seat, in which fits the conical plug G, when the cap is screwed on.

The lower end of the capsule is formed by flattening down the tube, smearing it with paraffine or wax, and then doubling it over, so as to form a seam or double seam.

The capsules are intended to contain the extracts, or inspissated juices of medicinal vegetables, evaporated to such a consistency as may render them convenient for administration or admixture.

The means of preserving them hermetically closed from the atmosphere will admit of their being preserved in a less condensed form, when so desired, than when preserved in the ordinary gallipots or jars.

Among the materials for which my invention is designed, I may cite the extracts of dandelion, hyoscyamus, colchicum, digitalis, hellebore, belladonna, &c.

Claim.

What I claim as new is—

The hermetically-closed, flexible, and compressible capsule, for condensing vegetable extracts, as described.

H. L. PALMER.

Witnesses:
EDWARD H. KNIGHT,
JAS. MELDRUM.